(12) United States Patent
Croyle et al.

(10) Patent No.: US 11,801,796 B2
(45) Date of Patent: Oct. 31, 2023

(54) APPARATUS AND METHOD FOR COMMONIZATION OF FRONT DOORS BETWEEN VEHICLE CABS

(71) Applicant: Toyota Motor Engineering & Manufacturing North America, Inc., Plano, TX (US)

(72) Inventors: Nicholas A. Croyle, Ypsilanti, MI (US); Blaine Benson, Ann Arbor, MI (US); Peter C. Piper, Saline, MI (US); Luke W. Garnaut, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 154 days.

(21) Appl. No.: 17/459,951

(22) Filed: Aug. 27, 2021

(65) Prior Publication Data

US 2023/0061567 A1    Mar. 2, 2023

(51) Int. Cl.
*B60R 13/04* (2006.01)
*B60J 5/04* (2006.01)

(52) U.S. Cl.
CPC ........... *B60R 13/043* (2013.01); *B60J 5/0468* (2013.01); *B60J 5/0481* (2013.01)

(58) Field of Classification Search
CPC ...... B60R 13/043; B60R 13/04; B60J 5/0468; B60J 5/0481

USPC ........................................................ 296/1.08
See application file for complete search history.

(56) References Cited

U.S. PATENT DOCUMENTS

| | | | | |
|---|---|---|---|---|
| 6,086,139 A * | 7/2000 | Heim | ...................... | B60J 10/80 296/146.5 |
| 7,997,638 B2 * | 8/2011 | Inami | ...................... | B60R 13/04 296/146.9 |
| 8,465,089 B2 * | 6/2013 | Atkinson | ................ | B60R 13/04 296/209 |
| 9,168,813 B2 * | 10/2015 | Kasuya | .................... | B60J 10/86 |
| 10,457,224 B2 | 10/2019 | Katayama | | |
| 10,967,717 B2 * | 4/2021 | Sasaki | ...................... | B60J 10/36 |
| 2016/0288735 A1 * | 10/2016 | Horner | .................... | B60R 13/04 |

FOREIGN PATENT DOCUMENTS

JP    P2012218648 A    11/2012

* cited by examiner

*Primary Examiner* — Pinel E Romain
(74) *Attorney, Agent, or Firm* — SNELL & WILMER LLP

(57) ABSTRACT

A garnish configured to enable use of a common door for a two-door vehicle and a four-door vehicle. The garnish may have a body. The body may be directly mountable onto a carriage of the two-door vehicle between an outer panel and a rocker panel of the two-door vehicle. The body may have an edge that is flush to a rear edge of the common door when mounted. The body may have at least two edges forming approximately a 90-degree angle.

20 Claims, 4 Drawing Sheets

APPARATUS AND METHOD FOR COMMONIZATION OF FRONT DOORS BETWEEN VEHICLE CABS

BACKGROUND

1. Field

The present disclosure is directed to an apparatus and a method for enabling the use of a common front door for a vehicle having two doors and a vehicle having four doors.

2. Description of the Related Art

Vehicles (e.g., a car, an SUV, a truck, etc.) may have two-door and four-door cabin options. The two-door cabin and the four-door cabin may each require a unique set of front doors; the two-door cabin front doors may have to conform to a shape of side outer panels while the four-door cabin front doors may have to conform to a shape of the rear passenger doors. The four-door cabin front doors may each have to have a corner having a sharp radius where a rear edge and a bottom edge of the door meets in order to mate flush with the rear passenger doors. However, the two-door cabin front doors may not have the corner having the sharp radius due to formability constraints of the side outer panel. The side outer panel, which is generally made of concave sheet metal, may not be formed to conform to the corner of the front door having the sharp radius and would undergo metallic failure during such a process.

Hence, there is a need for an apparatus and a method for enabling use of a common front door for a vehicle having two doors and a vehicle having four doors.

SUMMARY

A vehicle, a garnish, and a method for enabling use of a common door for a two-door vehicle and a four-door vehicle is disclosed herein. The garnish may have a body. The body may be directly mountable onto a carriage of the two-door vehicle between an outer panel and a rocker panel of the two-door vehicle. The body may have an edge that is flush to a rear edge of the common door when mounted. The body may have at least two edges forming approximately a 90-degree angle.

In one aspect, the invention is embodied in a vehicle comprising a carriage having a top end and a bottom end. The vehicle includes a door frame located on a left side and a right side of the carriage. The vehicle includes a door receivable by the door frame on the left side and the right side. The door has a rear edge. The vehicle includes an outer panel adjacent to the door frame on the left side and the right side of the carriage. The outer panel partially extends from the top end to the bottom end. The vehicle includes a rocker panel extending across the bottom end. The vehicle includes a garnish mounted directly onto the carriage and extending between the outer panel and the rocker panel. The garnish has an edge flush to the rear edge.

These and other embodiments may optionally include one or more of the following features. The rear edge of the door and a bottom edge of the garnish may form approximately a 90-degree angle. The garnish and the outer panel may be flush. The garnish and the outer panel may have an identical outer surface structure. The garnish may be made of a resin. The garnish may be made of a metal sheet that is different than a metal sheet that the outer panel is made of.

In another aspect, the invention may be embodied in a garnish configured to enable use of a common door for a first vehicle having two doors and a second vehicle having four doors. The garnish includes a body. The body is directly mountable onto a carriage of the first vehicle between an outer panel and a rocker panel of the first vehicle. The body may have an edge flush to a rear edge of the common door when mounted and at least two edges forming approximately a 90-degree angle.

These and other embodiments may optionally include one or more of the following features. The garnish may include at least one male component configured to be received by at least one female component located on the carriage to mount the body onto the carriage. The body and the outer panel may be flush when the garnish is mounted onto the carriage. The body and the outer panel may have an identical outer surface structure. The body may be made of resin. The body may be made of a metal sheet that is different than a metal sheet that the outer panel is made of.

In another aspect, the invention may be embodied in a method for enabling installation of a common door for a first vehicle having two doors and a second vehicle having four doors on the first vehicle. The method includes mounting an outer panel adjacent to a door frame of the first vehicle on a left side and a right side of a carriage of the first vehicle. The outer panel partially extends from a top end of the first vehicle to a bottom end of the first vehicle. The method includes mounting a garnish directly onto the carriage, the garnish extending between the outer panel and a rocker panel extending across the bottom end. The garnish has an edge flush to a rear edge of the common door.

These and other embodiments may optionally include one or more of the following features. Mounting the garnish may include inserting at least one male component extending outward from a back surface of the garnish into at least one female component located on the carriage. The rear edge of the common door and a bottom edge of the garnish may form approximately a 90-degree angle. The garnish and the outer panel may be flush when mounted. The garnish and the outer panel may have an identical outer surface structure. The method may further include molding the garnish out of a resin. The method may further include forming the outer panel from a first metal sheet and forming the garnish from a second metal sheet.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The vehicle, apparatus, and method described herein enable use of a common front door for a vehicle having two doors and a vehicle having four doors. A garnish may be furnished between a side outer panel and a rocker panel of the two-door vehicle that advantageously conforms to the sharp radius of the bottom rear corner of the common front door. The garnish may be mounted directly onto a carriage of the two-door vehicle. The garnish may have an edge flush to a rear edge of the common front door. The rear edge of the common front door and a bottom edge of the garnish may form approximately a 90-degree angle. The garnish and the side outer panel may be advantageously flush and have an identical outer surface structure to give the illusion of one large side outer panel.

Figure 1:
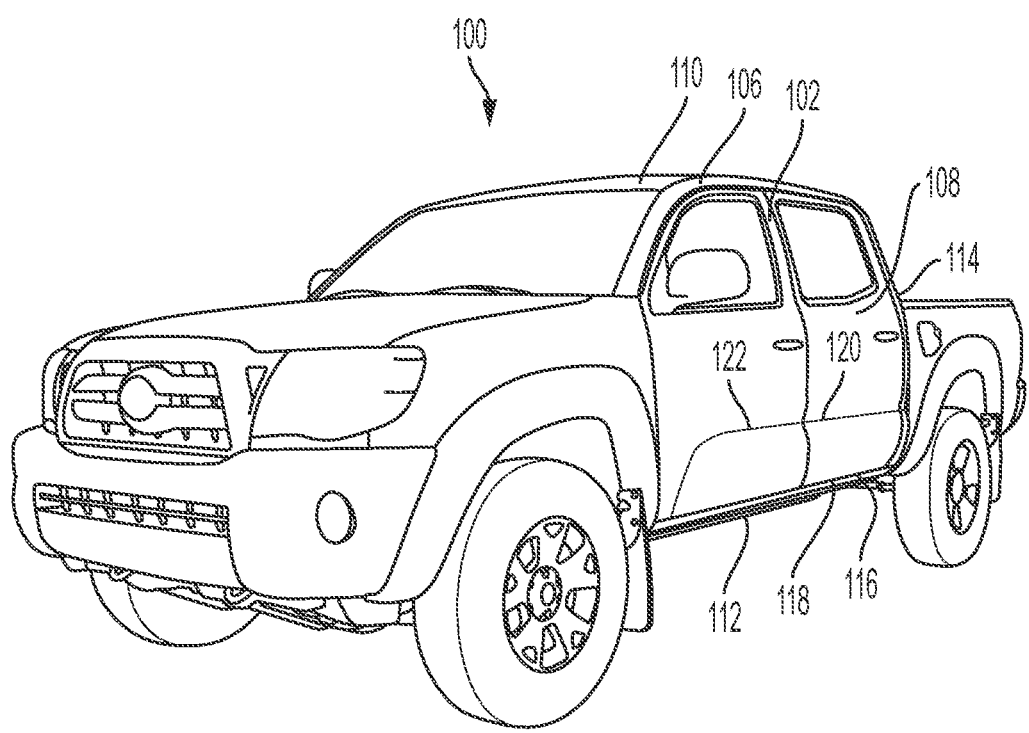
FIG. 1 illustrates a perspective view of a vehicle according to an aspect of the present disclosure.

FIG. 1 illustrates a perspective view of a vehicle 100 according to an aspect of the present disclosure. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, or other motor or battery driven vehicle. For example, the vehicle 100 may be an electric vehicle, a hybrid vehicle, a plug-in hybrid vehicle, a fuel cell vehicle, or any other type of vehicle that includes a motor/generator. FIG. 1 depicts a two-door pickup truck by example. The vehicle 100 may be an autonomous or semi-autonomous vehicle having self-driving capabilities.

The vehicle 100 may have front doors 102 to enter and exit out of the vehicle 100. The front doors 102 may be attached to door frames 104 (see FIG. 2) located on each side of a carriage 106 of the vehicle 100. The vehicle 100 may have an outer panel 108 adjacent to the door frame 104 on each side of the vehicle 100. The outer panel 108 may partially extend vertically from a top end 110 to a bottom end 112 of the carriage 106. The outer panel 108 may extend horizontally between the door frame 104 and a rear end 114 of the vehicle 100. The vehicle 100 may include a garnish 116 mounted directly onto the carriage 106. The garnish 116 may extend between the outer panel 108 and a rocker panel 118. The rocker panel 118 may extend across the bottom end 112. The rocker panel 118 may provide structural reinforcement and enhanced rigidity to the vehicle 100. The rocker panel 118 may further support the garnish 116 from below and prevent the garnish 116 from being peeled off from below. A seam 120 may form between the garnish 116 and the outer panel 108 due to their adjacent attachment. The seam 120 may be concealed by a cosmetic contour line, body line, or style line 122 traveling across the carriage 106. The garnish 116 and the outer panel 108 may have an identical outer surface structure. For example, an identical outer surface structure may be established by using the same paint on the garnish 116 and the outer panel 108. The identical outer surface structure may further conceal garnish 116 and provide the illusion of a long unitary outer panel 108 abutting the rocker panel 118. The identical outer surface structure may be smooth, glossy, matte, rough, or metallic by example.

Figure 2:
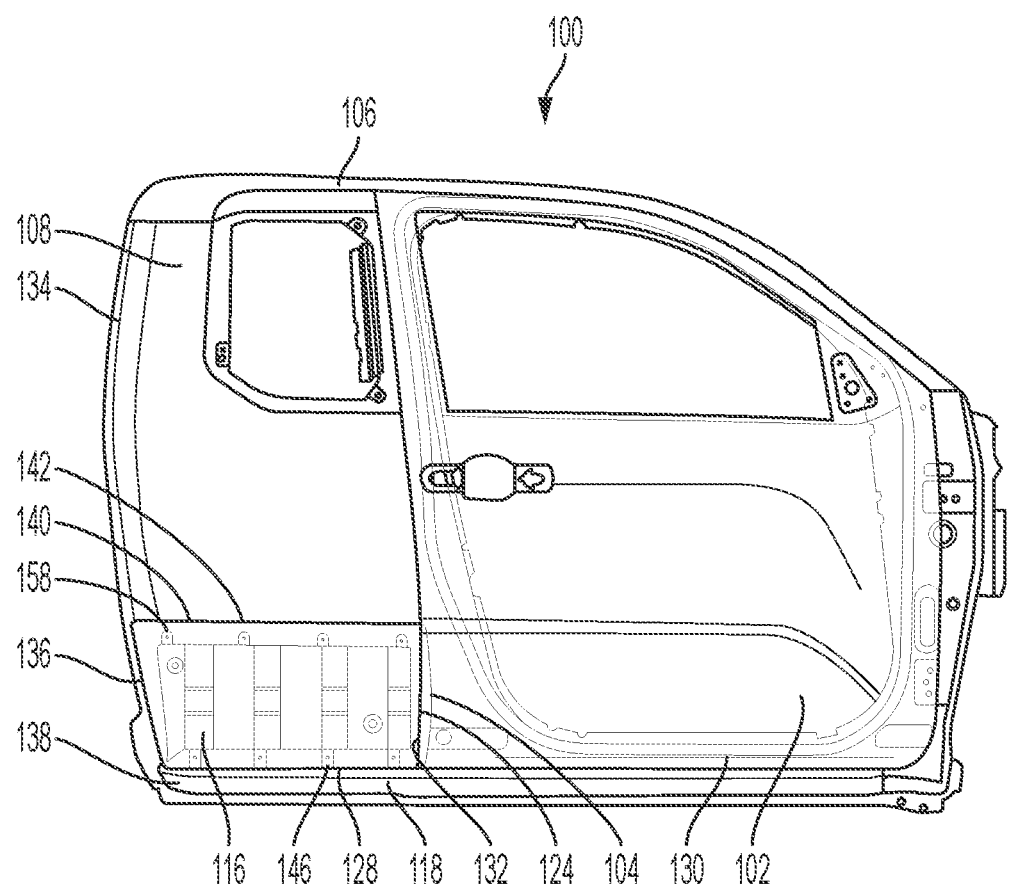
FIG. 2 illustrates an isolated side view of a carriage of the vehicle of FIG. 1 according to an aspect of the present disclosure.

FIG. 2 illustrates an isolated side view of the carriage 106 of the vehicle 100 according to an aspect of the present disclosure. The garnish 116 may be at least three-sided. A first side of the garnish 116 may abut the front door 102, a second side may abut the outer panel 108, and a third side may abut the rocker panel 118. In FIG. 2, the garnish 116 is shown as being four-sided by example. The garnish 116, the outer panel 108, and the front door 102 may be coplanar. The garnish 116 may have a front edge 124 conforming to a shape of a rear edge 126 of the front door 102. The front edge 124 may be flush against the rear edge 126. The rear edge 126 and a bottom edge 128 of the garnish 116 may form approximately a 90-degree angle. Said differently, the rear edge 126 and a bottom edge 130 of the front door 102 may form a sharp corner 132, or a corner having a sharp radius, and the garnish 116 may abut the sharp corner 132. Thus, the bottom edge 128 and the front edge 124 may also form approximately a 90-degree angle. The garnish 116 may also conform to the shape of the outer panel 108 and the rocker panel 118. A rear edge 134 of the outer panel 108, a rear edge 136 of the garnish 116, and a rear edge 138 of the rocker panel 118 may be colinear. A top edge 140 of the garnish 116 may be flush against a bottom edge 142 of the outer panel 108. The bottom edge 128 of the garnish 116 may be flush against a top edge 146 of the rocker panel 118.

Figure 3B:
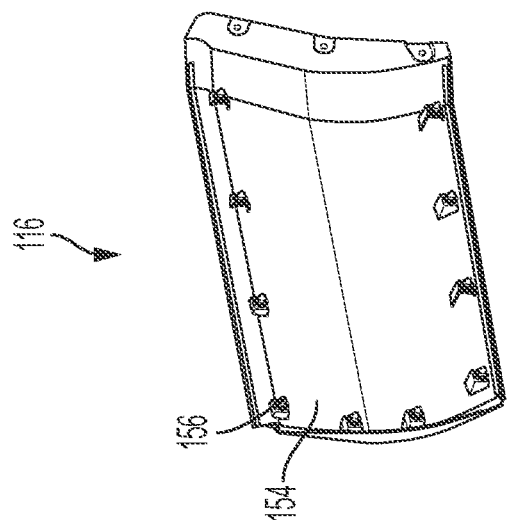
FIG. 3B illustrates a rear perspective view of the garnish of FIG. 3A according an aspect of the present disclosure.
Figure 3A:
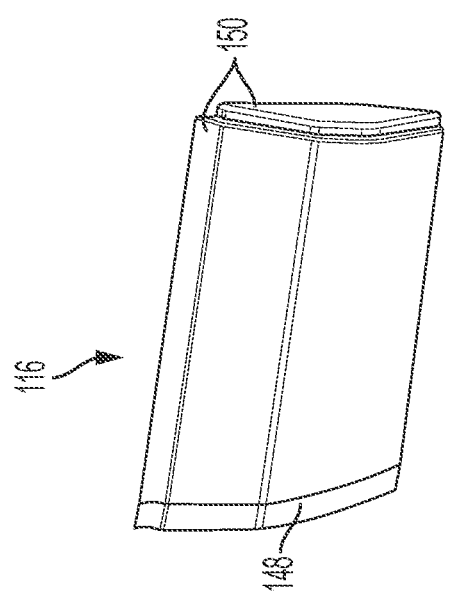
FIG. 3A illustrates a front perspective view of a garnish according to an aspect of the present disclosure.

FIG. 3A illustrates a front perspective view of the garnish 116 according to an aspect of the present disclosure. The garnish 116 may be a unitary construction. In some embodiments, the garnish 116 may have a plurality of segments. The garnish 116 may be made of a resin. For example, the resin may be a polypropylene resin. The garnish 116 may be made by molding the resin. In some embodiments, the garnish 116 may be made of metal. Particularly, the garnish 116 may be made of a metal sheet different from that of the outer panel 108 (see FIG. 2). The use of a different sheet metal may be due to the concave sheet metal of the outer panel 108 not being able to be formed to conform to the corner 132 (see FIG. 2) of the front door 102 (see FIG. 2) without experiencing metallic failure. The material forming the garnish 116 may have a thickness. The thickness may be uniform throughout the garnish 116. Preferably, the thickness may be between 0.05 to 4 millimeters (mm). Most preferably, the thickness may be between 0.65 to 2.5 mm.

The garnish 116 may have a front surface 148. The front surface 148 may have an identical structure to that of the outer panel 108. In some embodiments, the front surface 148 may be smooth as shown in FIG. 3A. In some embodiments, the front surface 148 may have one or more contour lines, body lines, or style lines. In some embodiments, the front surface 148 may be rough; for instance, the front surface 148 may be coated with a protective polymer liner (e.g., polyurea and polyaspartic formulations).

The garnish 116 may have side surfaces 150. The side surfaces 150 may define a depth of the garnish 116.

FIG. 3B illustrates a rear perspective view of the garnish 116 according an aspect of the present disclosure. In some embodiments, the garnish 116 may be concave. The curved in surface of the concave shape may be a rear surface 154 of the garnish 116. In some embodiments, the rear surface 154 may be recessed towards the front surface 148 (see FIG. 3A). The rear surface 154 may have at least one male fastener component 156 extending outwards therefrom. The at least one male fastener component 156 may be receivable by at least one female fastener component 158 (see FIG. 2) located on the carriage 106 (see FIG. 2). The at least one male fastener component 156 and the at least one female fastener component 158 may be held together by a snap fitment. In some embodiments, the at least one male fastener component 156 may be a screw, a bolt, a nail, a clip, and/or the like. In such embodiments, the female fastener component 158 may be a hole that may have threads engageable with threads of the male fastener component 156.

Figure 4:
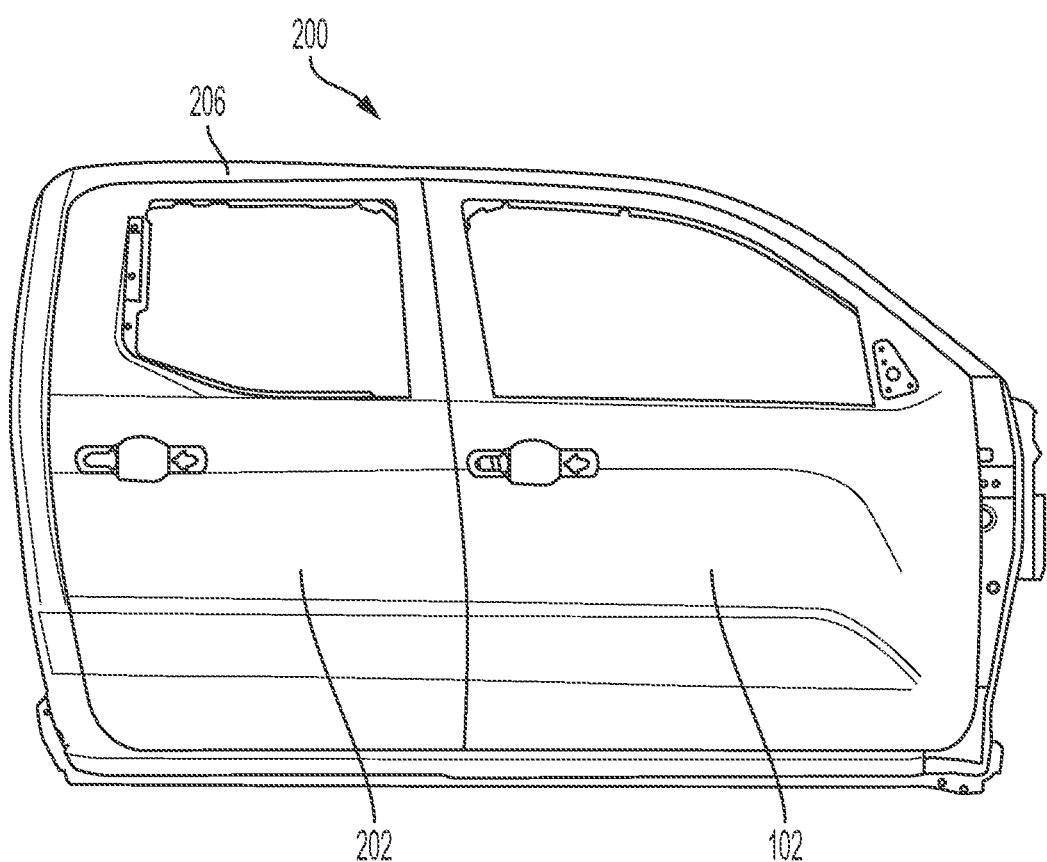
FIG. 4 illustrates an isolated side view of a carriage of a four-door configuration of the vehicle of FIG. 1 according to an aspect of the present disclosure.

FIG. 4 illustrates an isolated side view of a carriage 206 of a four-door configuration 200 of the vehicle 100 (see FIG. 1) according to an aspect of the present disclosure. The front doors 102 of the vehicle 100 may be used in the four-door configuration 200. The front doors 102 may abut rear doors 202 in lieu of the outer panel 108 (see FIG. 2) and the garnish 116 (see FIG. 2).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle comprising:
   a carriage having a top end and a bottom end;
   a door frame located on a side of the carriage;
   a door receivable by the door frame and having a rear edge, the door having a common configuration compatible with another vehicle having a different number of doors than a number of doors on the vehicle;
   an outer panel adjacent to the door frame and partially extending from the top end on the carriage to the bottom end on the carriage;
   a rocker panel extending across the bottom end on the carriage; and
   a garnish mounted directly onto the carriage and extending between the outer panel and the rocker panel, the garnish having an edge flush to the rear edge on the door to enable use of the door having the common configuration compatible with the another vehicle having the different number of doors than the number of doors on the vehicle.

2. The vehicle of claim 1, wherein the rear edge on the door and a bottom edge on the garnish form approximately a 90-degree angle.

3. The vehicle of claim 1, wherein the garnish and the outer panel are flush.

4. The vehicle of claim 1, wherein the garnish and the outer panel have an identical outer surface structure.

5. The vehicle of claim 1, wherein the garnish is made of a resin.

6. The vehicle of claim 1, wherein the garnish includes at least one male component configured to be received by at least one female component located on the carriage to mount the garnish onto the carriage.

7. The vehicle of claim 1, wherein the garnish is made of a metal sheet that is different than a metal sheet that the outer panel is made of.

8. A garnish configured to enable use of a common door for a first vehicle having two doors and a second vehicle having four doors, the garnish comprising:
   a body directly mountable onto a carriage on the first vehicle between an outer panel on the first vehicle and a rocker panel on the first vehicle, the body having an edge flush to a rear edge on the common door when mounted and at least two edges forming approximately a 90-degree angle.

9. The garnish of claim 8, further comprising at least one male component configured to be received by at least one female component located on the carriage to mount the body onto the carriage.

10. The garnish of claim 8, wherein the body and the outer panel are flush when the garnish is mounted onto the carriage.

11. The garnish of claim 8, wherein the body and the outer panel have an identical outer surface structure.

12. The garnish of claim 8, wherein the body is made of a resin.

13. The garnish of claim 8, wherein the body is made of a metal sheet that is different than a metal sheet that the outer panel is made of.

14. A method for enabling installation of a common door for a first vehicle having two doors and a second vehicle having four doors on the first vehicle, the method comprising:
   mounting an outer panel adjacent to a door frame on the first vehicle on each of a left side on a carriage on the first vehicle and a right side on the carriage on the first vehicle, the outer panel partially extending from a top end on the first vehicle to a bottom end on the first vehicle; and
   mounting a garnish directly onto the carriage on the first vehicle, the garnish extending between the outer panel and a rocker panel extending across the bottom end on the first vehicle, the garnish having an edge flush to a rear edge on the common door.

15. The method of claim 14, wherein mounting the garnish includes inserting at least one male component extending outward from a back surface on the garnish into at least one female component located on the carriage.

16. The method of claim 14, wherein the rear edge on the common door and a bottom edge on the garnish form approximately a 90-degree angle.

17. The method of claim 14, wherein the garnish and the outer panel are flush when mounted.

18. The method of claim 14, wherein the garnish and the outer panel have an identical outer surface structure.

19. The method of claim 14, further comprising molding the garnish out of a resin.

20. The method of claim 14, further comprising forming the outer panel from a first metal sheet and forming the garnish from a second metal sheet different than the first metal sheet.

* * * * *